(12) United States Patent
Kwon et al.

(10) Patent No.: US 11,912,910 B2
(45) Date of Patent: Feb. 27, 2024

(54) CONDUCTIVE FILM LAMINATE AND METHOD OF FABRICATING THE SAME

(71) Applicant: DONGWOO FINE-CHEM CO., LTD., Jeollabuk-do (KR)

(72) Inventors: Hyuk Hwan Kwon, Gyeonggi-do (KR); Sun Kwon Ahn, Gyeonggi-do (KR); Chang Yong Lee, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 323 days.

(21) Appl. No.: 17/211,986

(22) Filed: Mar. 25, 2021

(65) Prior Publication Data
US 2021/0301181 A1 Sep. 30, 2021

(30) Foreign Application Priority Data
Mar. 31, 2020 (KR) .................. 10-2020-0039113

(51) Int. Cl.
| | | |
|---|---|---|
| C09J 9/02 | (2006.01) | |
| H01B 5/14 | (2006.01) | |
| C09J 7/40 | (2018.01) | |
| G06F 3/044 | (2006.01) | |
| B32B 7/06 | (2019.01) | |

(Continued)

(52) U.S. Cl.
CPC .................. *C09J 9/02* (2013.01); *B32B 7/06* (2013.01); *B32B 7/12* (2013.01); *B32B 38/0004* (2013.01); *C09J 7/403* (2018.01); *H01B 5/14* (2013.01); *B32B 2307/202* (2013.01); *C09J 2203/326* (2013.01); *G06F 3/044* (2013.01)

(58) Field of Classification Search
CPC ........ C09J 9/02; C09J 7/403; C09J 2203/326; C09J 2301/204; C09J 7/29; C09J 2203/318; C09J 7/203; B32B 7/06; B32B 7/12; B32B 38/0004; B32B 2307/202; B32B 37/12; B32B 2457/20; H01B 5/14; H01B 13/00; G06F 3/044; G06F 3/04164; G06F 3/0443; G06F 2203/04103; G06F 3/0446
See application file for complete search history.

(56) References Cited

U.S. PATENT DOCUMENTS 5,897,727 A * 4/1999 Staral .................. H05K 3/20
156/99
2005/0276918 A1 12/2005 Tam
(Continued)

FOREIGN PATENT DOCUMENTS

| CN | 104064615 A | 9/2014 |
|---|---|---|
| CN | 109790425 A | 5/2019 |

(Continued)

*Primary Examiner* — Patricia L. Nordmeyer
(74) *Attorney, Agent, or Firm* — The PL Law Group, PLLC

(57) ABSTRACT

A conductive film laminate according to an embodiment of the present disclosure includes a carrier substrate, a conductive film liner on the carrier substrate, and a conductive adhesive film formed on the conductive film liner. The conductive film liner and the conductive adhesive film may form a cut pattern which does not cover the entire carrier substrate. The conductive adhesive film having a narrow width can be stably supplied on the carrier substrate. The conductive adhesive film may be used as an anisotropic conductive film for a bonding process of a touch sensor.

7 Claims, 5 Drawing Sheets

(51) Int. Cl.
*B32B 7/12* (2006.01)
*B32B 38/00* (2006.01)

(56) References Cited

U.S. PATENT DOCUMENTS

| | | | |
|---|---|---|---|
| 2007/0065620 A1* | 3/2007 | Nonaka | B32B 27/36 |
| 2007/0087153 A1* | 4/2007 | Port | B32B 27/365 |
| | | | 428/40.1 |
| 2014/0093666 A1 | 4/2014 | Tsuzuki et al. | |
| 2014/0141195 A1* | 5/2014 | Liang | C09J 9/02 |
| | | | 428/98 |
| 2016/0143174 A1 | 5/2016 | Cho | |

FOREIGN PATENT DOCUMENTS

| | | | | |
|---|---|---|---|---|
| EP | 0134606 A2 | 3/1985 | | |
| IN | 103999195 A | 8/2014 | | |
| KR | 10-0716809 B1 | 5/2007 | | |
| KR | 10-2009-0052373 A | 5/2009 | | |
| WO | WO-2013089982 A1 * | 6/2013 | | C09J 5/00 |
| WO | WO 2016/188646 A1 | 12/2016 | | |

\* cited by examiner

CONDUCTIVE FILM LAMINATE AND METHOD OF FABRICATING THE SAME

CROSS-REFERENCE TO RELATED APPLICATION AND CLAIM OF PRIORITY

This application claims priority to Korean Patent Applications No. 10-2020-0039113 filed on Mar. 31, 2020 in the Korean Intellectual Property Office (KIPO), the entire disclosure of which is incorporated by reference herein.

BACKGROUND

1. Field

The present invention relates to a conductive film laminate and a method of fabricating the same. More particularly, the present invention relates to a conductive film laminate including an insulating layer and a conductive layer and a method of fabricating the same.

2. Description of the Related Art

Recently, an image display device in which a touch input function is combined with a display function has been actively developed in a product such as a smart phone, a tablet PC and a center fascia of an automobile. Accordingly, a touch sensor or a touch panel may be stacked on a display panel of the image display device.

The touch sensor includes sensing electrodes for recognizing a user's touch input and peripheral circuits for applying a signal to the sensing electrodes. The peripheral circuits may be bonded to a flexible printed circuit board (FPCB) at a bezel portion of the image display device to receive a driving signal from a driving integrated circuit chip.

The flexible printed circuit board may be bonded by being pressed on the peripheral circuits of the touch sensor in the bezel portion through, e.g., an anisotropic conductive film (ACF).

When a dimension of a display screen of the image display device is increased within a limited area, an area of the bezel portion is decreased, and thus an area or a width of the anisotropic conductive film is also decreased. In this case, the anisotropic conductive film in a state having the reduced size may not be easily supplied.

Additionally, as a cutting size of the anisotropic conductive film decreases, a leakage of a resin material and a poor bonding may be caused.

For example, Korean Registered Patent Publication No. 10-0716809 discloses electrical connection between an anisotropic conductive film and a flexible printed circuit board, but does not consider the fabrication of the anisotropic conductive film with a fine line width as described above.

SUMMARY

According to an aspect of the present invention, there is provided a conductive film laminate having improved structural and mechanical stability and a method of fabricating the same.

The above aspects of the present inventive concepts will be achieved by the following features or constructions:

(1) A conductive film laminate, including: a carrier substrate; a conductive film liner on the carrier substrate, and a conductive adhesive film formed on the conductive film liner, wherein the conductive film liner and the conductive adhesive film forms a cut pattern which does not cover the entire carrier substrate.

(2) The conductive film laminate according to the above (1), further including a separation adhesive layer formed between the carrier substrate and the conductive film liner.

(3) The conductive film laminate according to the above (2), further including a liner layer including a release liner material on the separation adhesive layer, the liner layer having a liner pattern spaced apart from the cut pattern on the separation adhesive layer.

(4) The conductive film laminate according to the above (3), wherein the liner pattern includes a pair of liner patterns spaced apart from the cut pattern to face each other in a horizontal direction.

(5) The conductive film laminate according to the above (1), further including a first release layer formed between the conductive film liner and the conductive adhesive film.

(6) The conductive film laminate according to the above (5), further including a second release layer covering the cut pattern.

(7) The conductive film laminate according to the above (1), wherein the conductive adhesive film includes an anisotropic conductive film (ACF).

(8) A method of fabricating a conductive film laminate including forming a liner layer on a carrier substrate; partially removing the liner layer to form an opening; forming a pre-laminate that includes a conductive film liner layer and a conductive adhesive layer on the conductive film liner layer in the opening; and cutting the pre-laminate to form a cut pattern.

(9) The method according to the above (8), wherein the cutting of the pre-laminate includes repeating the cutting a plurality of times while moving a cutter that includes convex portions at both ends of the cutter.

(10) The method according to the above (9), wherein the cutting includes moving the cutter so that cut regions by the convex portions of the cutter overlap each other.

(11) The method according to the above (9), wherein a liner pattern is formed by the partially removing the liner layer, and the cutting of the pre-laminate includes moving the cutter in a direction parallel to a sidewall of the liner pattern.

(12) The method according to the above (8), further including forming a separation adhesive layer on the carrier substrate before forming the liner layer.

According to an embodiment of the present invention, a conductive adhesive layer may be formed on a carrier substrate, and the conductive adhesive layer may be cut to form a conductive adhesive film having a reduced width. The cutting process and a conveying of the conductive adhesive film having the reduced width may be performed on the carrier substrate so that a supply stability of a fine-width conductive film laminate may be enhanced.

In an embodiment, a liner pattern horizontally spaced apart from the conductive adhesive film may be formed on the carrier substrate. A step difference due to the conductive adhesive film may be reduced by the liner pattern, so that the conductive film laminate may be stably wound on a roll or a reel.

In an embodiment, the cutting process may be repeatedly performed so that convex portions may overlap by using a cutter having the convex portions at both ends thereof. Thus, the fine-width conductive adhesive film may be manufactured with high reliability without defects such as a resin leakage.

DETAILED DESCRIPTION OF THE EMBODIMENTS

According to an exemplary embodiment of the present invention, there is provided a conductive film laminate including a carrier substrate and a conductive adhesive film and a method of fabricating the conductive film laminate.

The conductive film laminate may include a conductive adhesive film for an electrical connection between a circuit board (e.g., a flexible printed circuit board (FPCB)) and a pad for various signal transfer and data reception of, e.g., a touch sensor, an antenna device or an image display device.

Hereinafter, the present invention will be described in detail with reference to the accompanying drawings. However, those skilled in the art will appreciate that such an embodiment described with reference to the accompanying drawings are provided to further understand the spirit of the present invention and do not limit subject matters to be protected as disclosed in the detailed description and appended claims.

Figure 1:
FIG. 1. is a schematic cross-sectional view illustrating a conductive film laminate in accordance with an exemplary embodiment.

FIG. 1. is a schematic cross-sectional view illustrating a conductive film laminate in accordance with an exemplary embodiment.

Referring to FIG. 1, the conductive film laminate may include a carrier substrate 100, a conductive film liner 135 and a conductive adhesive film 155.

The carrier substrate 100 may include a resin material having sufficient flexibility and mechanical stability for winding the conductive film laminate to a roll or a reel. For example, non-limiting examples of the carrier substrate 100 may include cyclo olefin polymer (COP), polyethylene terephthalate (PET), polyacrylate (PAR), polyether imide (PEI), polyethylene naphthalate (PEN), polyphenylene sulfide (PPS), polyallylate, polyimide (PI), cellulose acetate propionate (CAP), polyether sulfone (PES), cellulose triacetate (TAC), polycarbonate (PC), cyclo olefin copolymer (COC), polymethylmethacrylate (PMMA), etc.

In an embodiment, a separation adhesive layer 110 may be formed on the carrier substrate 100. The separation adhesive layer 110 may include, e.g., an adhesive material having a sufficient adhesion to the conductive film liner 135 to selectively separate the conductive adhesive film 155. The separation adhesive layer 110 may be formed using, e.g., an acrylic or silicone-based adhesive.

The conductive film liner 135 may be formed on the separation adhesive layer 110. The conductive film liner 135 may include a release film for selectively separating the conductive adhesive film 155 from the conductive film laminate. A release liner material commonly used in the field of an organic film laminate may be used as the conductive film liner 135 without a particular limitation.

The conductive adhesive film 155 may be laminated on the conductive film liner 135. In an exemplary embodiment, the conductive adhesive film 155 may be an anisotropic conductive film (ACF) including a resin layer and conductive balls dispersed in the resin layer. For example, the ACF commonly used in the related art may be used as the conductive adhesive film 155 without a particular limitation.

In an embodiment, a first release layer 140 may be formed between the conductive film liner 135 and the conductive adhesive film 155. The conductive adhesive film may be easily peeled from the conductive film laminate by the first release layer 140. The first release layer 140 may include, e.g., a silicone release coating layer.

In an embodiment, a second release layer 170 may be formed on the conductive adhesive film 155. The second release layer 170 may serve as, e.g., a protective film of the conductive film laminate. When the conductive adhesive film 155 is attached to an object, the second release layer 170 may be peeled off, and then the conductive adhesive film 155 may be separated from the conductive film laminate to be supplied.

Figure 2:
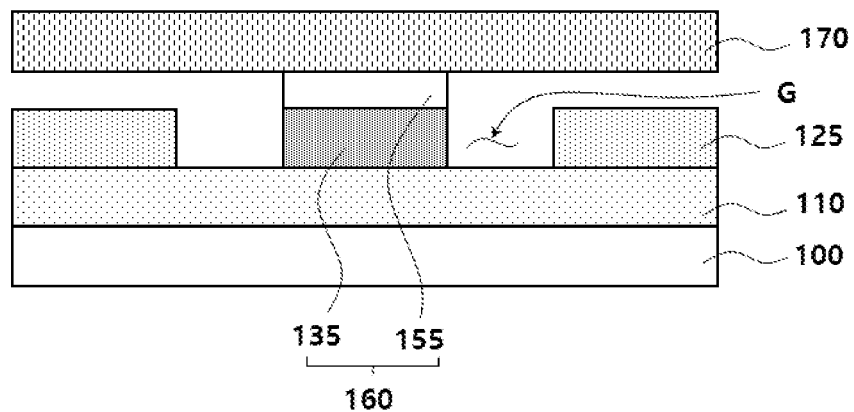
FIG. 2 is a schematic cross-sectional view illustrating a conductive film laminate in accordance with an exemplary embodiment.

FIG. 2 is a schematic cross-sectional view illustrating a conductive film laminate in accordance with an exemplary embodiment.

Referring to FIG. 2, as described above, the separation adhesive layer 110 may be formed on the carrier substrate 100, and the conductive film liner 135 and the conductive adhesive film 155 may be sequentially formed on the separation adhesive layer 110. The conductive film liner 135 and the conductive adhesive film 155 may be provided as a cut pattern 160 sharing substantially the same cut lateral face.

A liner pattern 125 may be formed on the separation adhesive layer 110. The liner pattern 125 may be positioned on the separation adhesive layer 110 together with the cut pattern 160.

In an exemplary embodiment, the liner pattern 125 may be horizontally spaced apart from both sides of the cut pattern 160. Accordingly, a gap G may be formed between the liner pattern 125 and the cut pattern 160.

For example, a pair of the liner patterns 125 may be formed to face each other with the cut pattern 160 interposed therebetween.

The liner pattern 125 may function as a partition wall pattern defining a space in which the cut pattern 160 is formed. Additionally, a step difference due to the cut pattern 160 may be reduced by the liner pattern 125.

The second release layer 170 may be attached on the cut pattern 160 to cover the conductive film laminate. For convenience of descriptions, the second release layer 170 is illustrated to have a floating shape from the liner pattern 125, but the second release layer 170 may also contact the liner pattern 125.

According to the above-described exemplary embodiments, the conductive adhesive film 155 including, e.g., ACF may be formed on the carrier substrate 100 to be stably supplied by being wound on a roll or a reel even when a width of the conductive adhesive film 155 decreases.

Additionally, the step difference may be reduced by the liner pattern 125 while achieving a space of the cut pattern 160 including the conductive adhesive film 155 so that a winding stability may be further improved.

FIGS. 3 to 6 are schematic cross-sectional views illustrating a method of fabricating a conductive film laminate in accordance with an exemplary embodiment.

Figure 3:
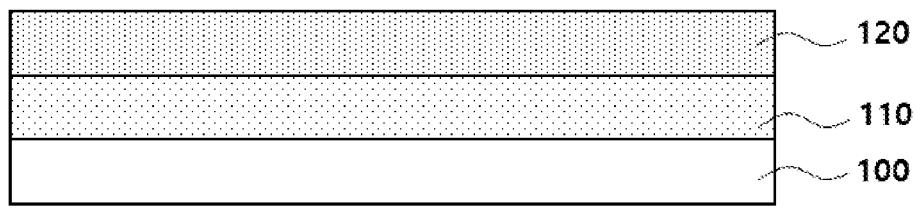
FIGS. 3 to 6 are schematic cross-sectional views illustrating a method of fabricating a conductive film laminate in accordance with an exemplary embodiment.

Referring to FIG. 3, a separation adhesive layer 110 and a liner layer 120 may be sequentially formed on a carrier substrate 100. The separation adhesive layer 110 may be formed using, e.g., a pressure sensitive adhesive (PSA) or optically clear adhesive (OCA)-based adhesive composition or adhesive tape.

The liner layer 120 may be formed using a release liner material commercially available in the field of tape or film laminates.

Figure 4:
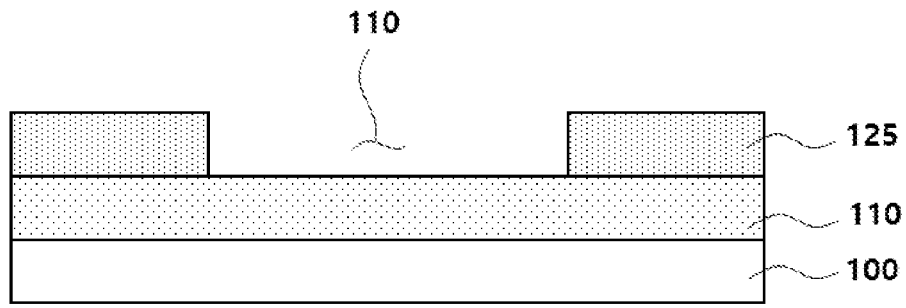

Referring to FIG. 4, the liner layer 120 may be partially cut or removed to form a liner pattern 125. For example, a central portion of the liner layer 120 may be cut/removed to form the liner pattern 125 extending substantially to be parallel to each other on both lateral portions of the separation adhesive layer 110. An opening 110 may be formed by a space from which the liner layer 120 is removed.

Figure 5:
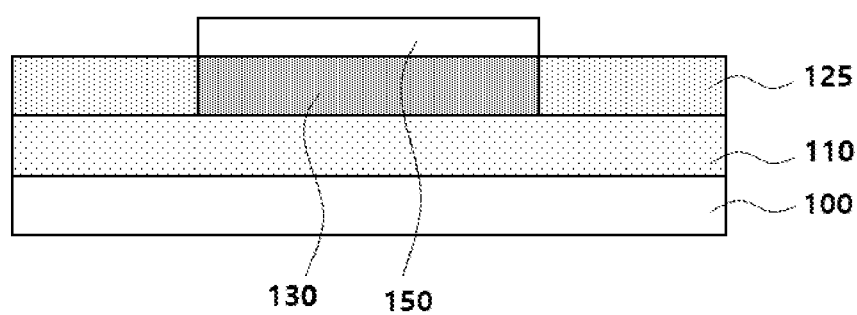

Referring to FIG. 5, a conductive film liner layer 130 and a conductive adhesive layer 150 may be formed in the opening 110. The conductive film liner layer 130 and the conductive adhesive layer 150 may substantially fill the opening 110 as one pre-laminate. For example, the pre-laminate may completely fill the opening 110.

The conductive film liner layer 130 may be formed using a release liner material substantially the same as or similar to that of the liner layer 120. The conductive adhesive layer 150 may be formed using, e.g., an ACF.

In the embodiment, as illustrated in FIG. 1, a first release layer 140 may be formed between the conductive film liner layer 130 and the conductive adhesive layer 150.

Figure 6:
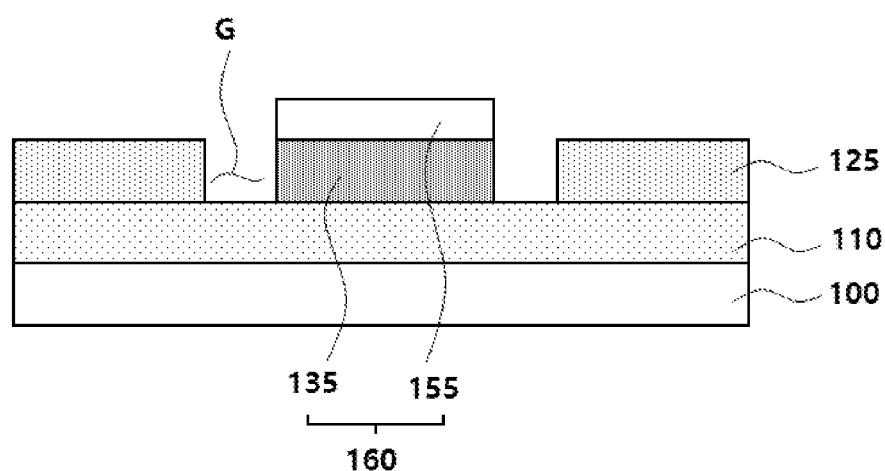

Referring to FIG. 6, the pre-laminate formed in the opening 110 may be cut to form a cut pattern 160 including a conductive film liner 135 and a conductive adhesive film 155.

The cut pattern 160 having a reduced width may be formed from the pre-laminate by the cutting process. Further, the cut pattern 160 may be spaced apart from the liner pattern 125 to form a gap G.

As described above, the cutting process of the conductive adhesive layer 150 may be performed while being combined with the carrier substrate 100, so that the conductive adhesive film 155 having a fine width may be formed more stably.

The liner pattern 125 may serve as a partition wall pattern supporting the pre-laminate during the cutting process. Further, the liner pattern 125 may substantially function as a guide pattern for performing the cutting process. Therefore, leakage/damage of a resin layer or conductive balls included in the conductive adhesive layer 150 may be prevented, and the cutting process may be stably performed.

Thereafter, as illustrated in FIG. 2, a second release layer 170 may be formed on the conductive adhesive film 155 and the liner pattern 125 to form a conductive film laminate.

Figure 7:
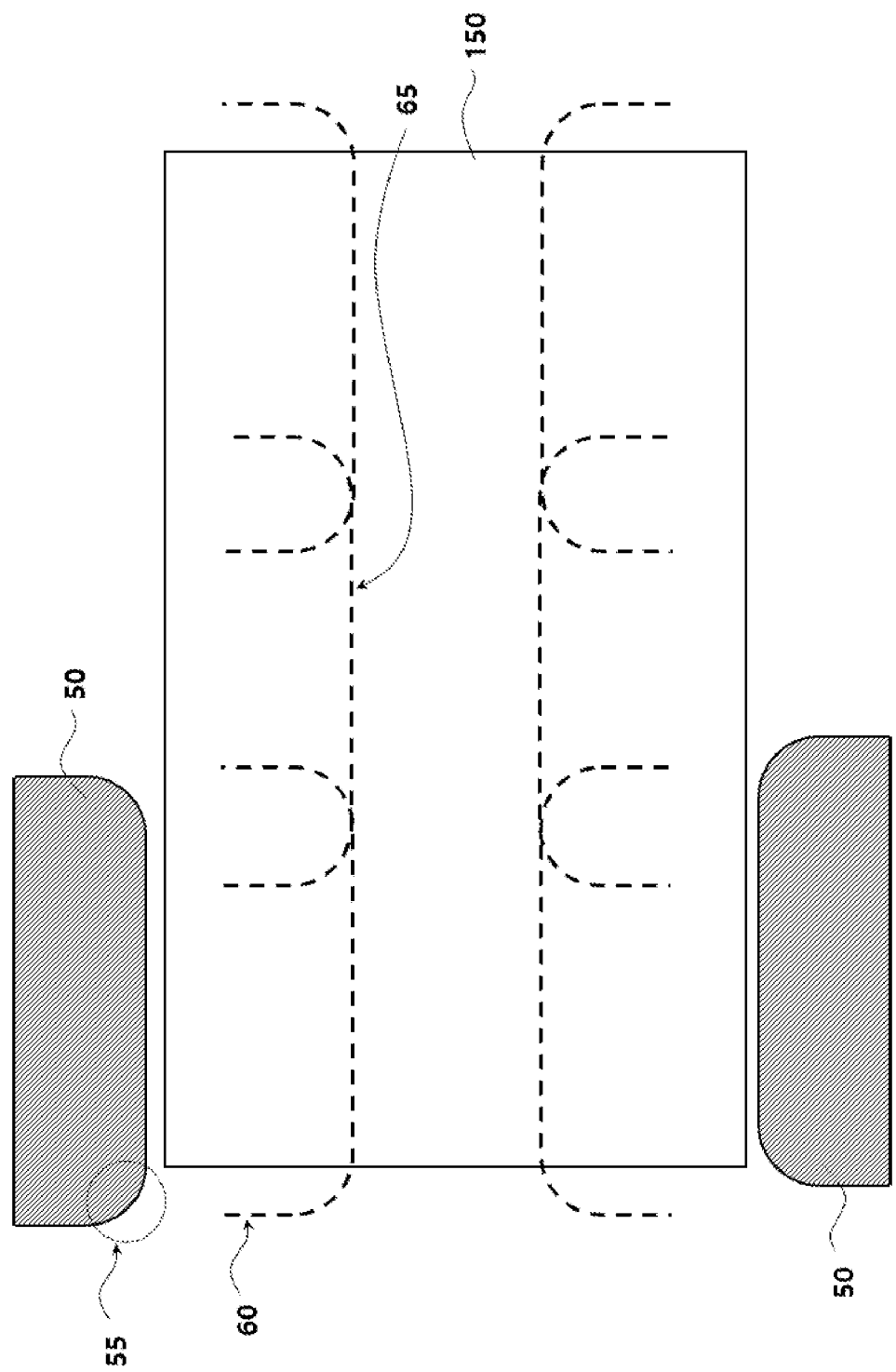
FIG. 7 is a schematic top planar view for describing a cutting process of a conductive adhesive layer in accordance with an exemplary embodiment.

FIG. 7 is a schematic top planar view for describing a cutting process of a conductive adhesive layer in accordance with an exemplary embodiment.

Referring to FIG. 7, as described with reference to FIG. 6, the pre-laminate including the conductive adhesive layer 150 may be cut using a cutter 50 to form the conductive adhesive film 155.

In an exemplary embodiment, convex portions 55 may be formed at both ends of the cutter 50. The convex portion 55 may have a curved shape. For example, a pair of the cutters 50 may be aligned on both ends of the conductive adhesive layer 150 in a width direction in a planar view, and then a cutting process may be performed repeatedly while moving the cutter 50 in a length direction.

The cutter 50 including the convex portion 55 that may have a curved shape may be utilized, so that mechanical damages to the conductive adhesive layer 150 at a cut edge portion may be prevented. Additionally, the cutting process may be gradually performed while moving the cutter 50 repeatedly, so that resin leakage at a cutting face may be suppressed.

In an embodiment, the liner pattern 125 may be substantially provided as a guide pattern for a cutting process. For example, the cutter 50 may be moved in a direction substantially parallel to the sidewall of the liner pattern 125 in the planar view As illustrated in FIG. 7, a sub-cutting line 60 of a dotted line shape may be formed by a single cutting, and the cutting may be repeated such that portions of the sub-cutting line 60 formed by the convex portion 55 or cut regions by the convex portion 55 may overlap while moving the cutter 50 in the length direction.

Accordingly, a cutting line 65 extending substantially as a linear line shape may be formed to obtain the conductive adhesive film 155 having a fine line width.

For example, the conductive adhesive film 155 having a fine line width of about 1 mm or less, about 0.5 mm or less, or about 0.4 mm or less may be formed with high reliability by utilizing the above-described stacked structure and cutting process.

Figure 8:
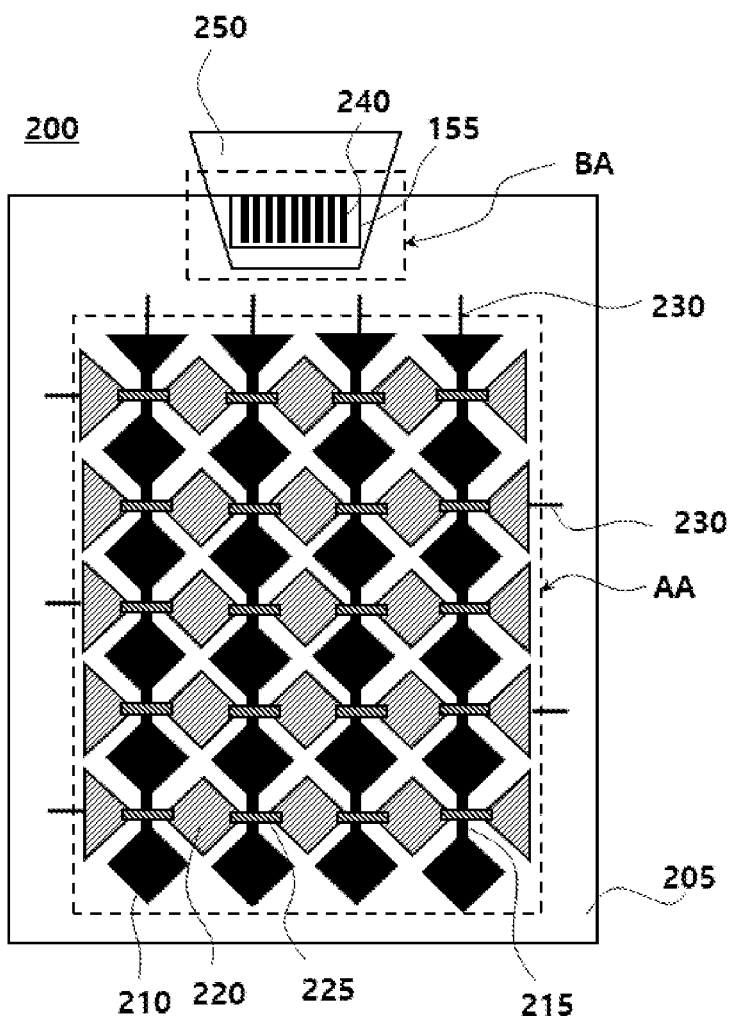
FIG. 8 is a schematic top planar view illustrating a touch sensor module fabricated in accordance with an exemplary embodiment.

FIG. 8 is a schematic top planar view illustrating a touch sensor module fabricated in accordance with an exemplary embodiment.

Referring to FIG. 8, a touch sensor module 200 may include sensing electrodes 210 and 220 arranged on a substrate layer 205.

The substrate layer 205 may include, e.g., a flexible transparent insulating material. For example, the substrate layer 105 may include a cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), polymethyl methacrylate (PMMA), or the like. The substrate layer 205 may include an inorganic insulating material such as glass or silicon oxide.

The substrate layer 205 may include an active area AA and a bonding area BA. The active area AA may include a central portion of the substrate layer 205 and may be an area in which a user's touch is substantially recognized to generate a signal. For example, when a user's touch is input onto the active area AA, a change in capacitance may occur due to the sensing electrodes 210 and 220. Accordingly, a physical touch may be converted into an electrical signal to implement a touch sensing.

The sensing electrodes 210 and 220 may include first sensing electrodes 210 and second sensing electrodes 220.

The first sensing electrodes 210 may be arranged along a length direction or a column direction of, e.g., the substrate layer 205 or the touch sensor module. Accordingly, a first sensing electrode column may be formed by a plurality of the first sensing electrodes 210. Additionally, a plurality of the first sensing electrode columns may be arranged along a width direction or a row direction.

In an embodiment, the first sensing electrodes 210 adjacent in the column direction may be physically or electrically connected to each other by a connector 215. For example, the connector 215 may be integrally formed with the first sensing electrodes at the same level.

The second sensing electrodes 220 may be arranged along the row direction or the width direction. In an embodiment, the second sensing electrodes 220 may be physically spaced apart from each other as island-type unit electrodes. In this case, the second sensing electrodes 220 adjacent in the row direction may be electrically connected to each other by a bridge electrode 225.

The second sensing electrodes 220 may be connected to each other by the bridge electrodes 225 and arranged in the row direction, so that a second sensing electrode row may be formed. A plurality of the second sensing electrode rows may be arranged along the column direction or the length direction.

The sensing electrodes 210 and 220 and the bridge electrode 225 may each include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca) or an alloy containing at least one of the metals (e.g., a silver-palladium-copper (APC) alloy or a copper-calcium (CuCa) alloy). These may be used alone or in a combination thereof. For example, the sensing electrodes 210 and 220 may have a mesh structure including the metal or alloy. The sensing electrodes 210 and 220, and the bridge electrode 225 may include a transparent conductive material, e.g., a transparent conductive oxide such as indium tin oxide (ITO), indium zinc oxide (IZO), zinc oxide (ZnO), indium zinc tin oxide (IZTO), cadmium tin oxide (CTO), etc., a silver nanowire (AgNW), carbon nanotube (CNT), graphene, s conductive polymer, etc.

In an embodiment, the sensing electrodes 210 and 220 may include a stacked structure of a transparent conductive oxide layer and a metal layer. For example, the sensing electrodes 210 and 220 may have a double layered structure of a transparent conductive oxide layer-metal layer, or a triple layered structure of a transparent conductive oxide layer-metal layer-transparent conductive oxide layer. In this case, a flexible property may be improved by the metal layer, and a signal transmission speed may be improved by a low resistance of the metal layer. Corrosion resistance and transparency may be improved by the transparent conductive oxide layer.

In an embodiment, the bridge electrode 225 may be formed on an insulating layer (not illustrated). The insulating layer may at least partially cover the connector 215 included in the first sensing electrodes 210 and at least partially cover the second sensing electrodes 220 around the connector 215. The bridge electrode 225 may be formed through the insulating layer and may be electrically connected to the second sensing electrodes 220 adjacent to each other with the connector 215 therebetween.

The insulating layer may include an inorganic insulating material such as silicon oxide or silicon nitride, or an organic insulating material such as an acrylic resin or a siloxane-based resin.

Traces 230 may branch and extend from each of the first sensing electrode columns and the second sensing electrode rows. The trace 230 may branch from each end portion of the first sensing electrode column and the second sensing electrode row, and may extend on a peripheral region of the active area AA.

The traces 230 may extend toward, e.g., a bonding area BA allocated to a portion of one end portion of the substrate layer 205 in the length direction. The terminal ends of the traces 230 may be collected on the bonding area BA of the substrate layer 205. Pads 240 may be formed on the bonding area BA, and may each be connected to the traces 230. In an embodiment, the terminal ends of the traces 230 may be provided as the pads 240.

For convenience of descriptions, a connection structure of the traces 230 and the pads 240 is omitted in FIG. 8.

In an embodiment, the above-described touch sensor module may be formed through a transfer process. For example, a sensing electrode layer including the above-described sensing electrodes 210 and 220, bridge electrodes 225 and traces 230 may be formed on a carrier substrate. Thereafter, the sensing electrode layer may be transferred to the substrate layer 205 and the carrier substrate may be peeled off and removed to obtain the touch sensor structure.

In an embodiment, a separation layer including an organic material for promoting the peel-off may be formed between the sensing electrode layer and the carrier substrate. The sensing electrode layer and the substrate layer 205 may be combined to each other through an adhesive layer.

According to exemplary embodiments described above, the conductive adhesive film 155 may be separated from the conductive film laminate and attached to the pads 240. Thereafter, a circuit board 250 such as, e.g., a flexible printed circuit board (FPCB) may be stacked on the conductive adhesive film 155 and a pressure bonding process may be performed.

Accordingly, the pads 240 and the circuit board 250 may be electrically connected to each other through the conductive adhesive film 155 to transmit a driving signal, a scan signal, etc., for a touch sensing.

When sizes of the pad portions 240 and the bonding area BA are decreased, the narrow conductive adhesive film 155 may be stably supplied and attached from the conductive film laminate according to the above-described exemplary embodiments. Accordingly, an area of the active area AA may be relatively increased while improving electrical stability and sensing reliability of the touch sensor module 200.

What is claimed is:

1. A conductive film laminate, comprising:
   a carrier substrate; and
   a conductive film liner on the carrier substrate; and
   a conductive adhesive film formed on the conductive film liner,
   wherein the conductive film liner is disposed between the carrier substrate and the conductive adhesive film, and the conductive film liner and the conductive adhesive film forms a cut pattern which does not cover the entire carrier substrate.

2. The conductive film laminate according to claim 1, further comprising a separation adhesive layer formed between the carrier substrate and the conductive film liner.

3. The conductive film laminate according to claim 2, further comprising a liner layer comprising a release liner material on the separation adhesive layer, the liner layer having a liner pattern spaced apart from the cut pattern on the separation adhesive layer.

4. The conductive film laminate according to claim 3, wherein the liner pattern comprises a pair of liner patterns spaced apart from the cut pattern to face each other in a horizontal direction.

5. The conductive film laminate according to claim 1, further comprising a first release layer formed between the conductive film liner and the conductive adhesive film.

6. The conductive film laminate according to claim 5, further comprising a second release layer covering the cut pattern.

7. The conductive film laminate according to claim 1, wherein the conductive adhesive film comprises an anisotropic conductive film (ACF).

\* \* \* \* \*